(12) United States Patent
Pacolt

(10) Patent No.: US 8,702,174 B2
(45) Date of Patent: Apr. 22, 2014

(54) ARMREST EXHIBITING MULTIPLE STACKED AND FIXED SECTORS IN ALIGNMENT WITH RETRACTABLE PAWLS AND EXHIBITING OFFSET ENGAGING TEETH FOR ENSURING INCREMENTAL PIVOTAL ADJUSTABILITY

(75) Inventor: Stanley D. Pacolt, Clarkston, MI (US)

(73) Assignee: BAE Industries, Inc., Warren, MI (US)

( * ) Notice: Subject to any disclaimer, the term of this patent is extended or adjusted under 35 U.S.C. 154(b) by 0 days.

(21) Appl. No.: 13/617,152

(22) Filed: Sep. 14, 2012

(65) Prior Publication Data

US 2013/0076096 A1    Mar. 28, 2013

Related U.S. Application Data

(60) Provisional application No. 61/539,929, filed on Sep. 27, 2011.

(51) Int. Cl.
A47C 7/54    (2006.01)

(52) U.S. Cl.
USPC .................................................. 297/411.38

(58) Field of Classification Search
USPC ................. 297/411.2, 411.3, 411.32, 411.35, 297/411.38
See application file for complete search history.

(56) References Cited

U.S. PATENT DOCUMENTS

| | | | |
|---|---|---|---|
| 4,244,623 A | 1/1981 | Hall et al. | |
| 4,521,564 A | 6/1985 | Solomon et al. | |
| 4,828,323 A | 5/1989 | Brodersen et al. | |
| 4,946,226 A | 8/1990 | Hurn et al. | |
| 5,702,157 A | 12/1997 | Hurite | |
| 5,873,633 A | 2/1999 | Lang et al. | |
| 5,941,603 A | 8/1999 | Wein | |
| 5,984,416 A * | 11/1999 | Waldo et al. | 297/411.38 |
| 6,209,960 B1 * | 4/2001 | Bradbury | 297/411.35 |
| 6,467,847 B2 | 10/2002 | Bidare | |
| 6,755,474 B2 * | 6/2004 | Magnuson | 297/411.38 |
| 7,326,878 B2 | 2/2008 | Odanaka et al. | |
| 7,393,058 B2 | 7/2008 | Omori | |
| 7,568,766 B2 | 8/2009 | Chen et al. | |
| 7,845,732 B2 | 12/2010 | Liu et al. | |
| 8,177,301 B2 | 5/2012 | Saito et al. | |
| 8,403,416 B2 | 3/2013 | Muck et al. | |
| 2007/0241603 A1 | 10/2007 | Otto | |
| 2008/0303335 A1 | 12/2008 | van de Ven et al. | |
| 2010/0308636 A1 | 12/2010 | Cebula et al. | |
| 2012/0235461 A1 | 9/2012 | Rosenbrock et al. | |

* cited by examiner

Primary Examiner — Milton Nelson, Jr.
(74) Attorney, Agent, or Firm — Gifford, Krass, Sprinkle, Anderson & Citkowski, P.C.; Douglas J. McEvoy

(57) ABSTRACT

An incrementally adjustable armrest associated with a seatback having an armrest supported in pivotal fashion to a frame location of the seatback. At least one sector is fixed to the seatback frame and supports a pivotal location associated with the armrest. A plurality of teeth are located along a circumferential edge extending location of the sector corresponding to a range of adjustment associated with the armrest. A plurality of pawls are arranged in a stacked relationship and are pivotally secured to the armrest at a location such that additional teeth associated with the pawls are biased in an engaging direction against the sector. A teethed pattern associated with a selected pawl individually seats within a circumferential location associated with the sector teeth.

20 Claims, 3 Drawing Sheets

ARMREST EXHIBITING MULTIPLE STACKED AND FIXED SECTORS IN ALIGNMENT WITH RETRACTABLE PAWLS AND EXHIBITING OFFSET ENGAGING TEETH FOR ENSURING INCREMENTAL PIVOTAL ADJUSTABILITY

CROSS REFERENCE TO RELATED APPLICATIONS

The present application claims the priority of U.S. Provisional Application Ser. No. 61/539,929 filed Sep. 27, 2011.

BACKGROUND OF THE INVENTION

1. Field of the Invention

An adjustment armrest exhibiting plural, such as three, stacked sectors and aligning, spring loaded and cable retractable pawls. The sectors exhibit an array of teeth exhibiting first angular offset or increment compared to that associated with the stacked pawls. The three sets of teeth patterns associated with each of the stacked pawls are offset, such as by example at 2° relative to one another, this in order to provide 2° incremental adjustability relative to a similar or greater angular offset integrated into the pawls, and as a result of a specified offset teeth pattern of a selected pawl seating with an aligning sector location at a given incremental offset. The stacked sectors can exhibit either a consistent incremental teethed pattern across is collective width or, alternatively, can incorporate a similar offset as compared to the retractable pawls, this in order to provide a structurally reinforced assembly.

2. Description of the Background Art

The prior art is documented with examples of pivotally adjustable seat armrest assemblies, such as applicable to both vehicular and non-vehicular applications. Examples of these include such as the multi-position armrest of Hall, U.S. Pat. No. 4,244,623 in which a parallelogram linkage permits the armrest to be raised or lowered through a series of parallel positions and locked in any one against downward movement. Hurite, U.S. Pat. No. 5,702,157 teaches an adjustable armrest mechanism incorporating a spring biased pawl which selectively engages a camming surface composed of a plurality of outward serrated teeth associated with an engageable ratchet.

SUMMARY OF THE PRESENT INVENTION

The present invention discloses an incrementally adjustable armrest associated with a seatback including at least one sector fixed to the seatback frame and supporting a pivotal location associated with the armrest. A plurality of teeth are located along a circumferential edge extending location of the sector corresponding to a range of adjustment associated with the armrest.

A plurality of pawls are arranged in a stacked relationship and are pivotally secured to the armrest at a location such that additional teeth associated with the pawls are biased in an engaging direction against the sector. A teethed pattern associated with a selected pawl individually seats within a circumferential location associated with the sector teeth.

In one application, a plurality of three stacked sectors align with three stacked pawls, each of the sectors including generally aligning and individual pluralities of teeth extending along a limited exterior facing circumferential range of adjustment. The pawls may each further exhibit a generally elongated body with first upper end located and aligning apertures receiving a staking rivet extending from the armrest support.

A plurality of arcuate shaped leaf springs may be secured to the armrest support and in order to bias the pawls towards the sector stack. The leaf springs are also mounted at outer aligning and curled ends with a first fixed post extending from a recessed surface location of the armrest support, such that the springs extend around and over a further fixedly projecting stop post to control deflective characteristics of the leaf springs in both concerted and individually displacing fashion. The leaf springs terminate in integrated fashion with rearward extending locations of corresponding pawls for influencing inwardly facing teethed surfaces thereof in a direction towards the aligning and fixed sectors.

Additional features include an intermediate stacked pawl being configured slightly differently from innermost and outermost stacked pawls and including a lowermost projecting and exposed portion which includes a proximately lower end located aperture for receiving a connecting end portion of a retraction cable. A pin extending from opposite sides of the intermediate pawl ravels a limited distance along lower surface extending channels defined in the outermost and innermost stacked pawls and, upon retraction of the cable against the leaf spring forces associated with the middle pawl, a pulling force is exerted against the outer and inner pawls such that the pawls all pivot outwardly in unison.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
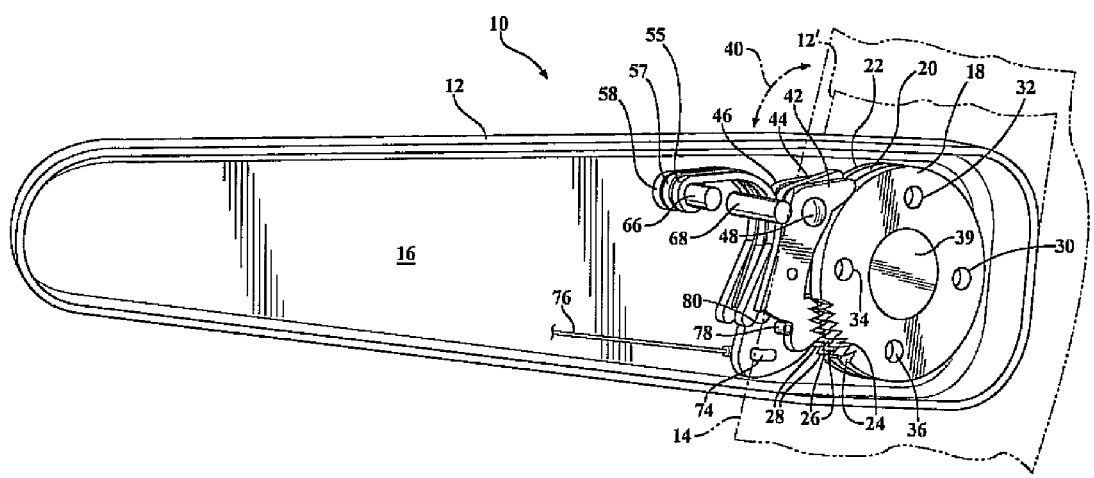
FIG. 1 is a first perspective view of the incrementally adjustable armrest.
Figure 2:
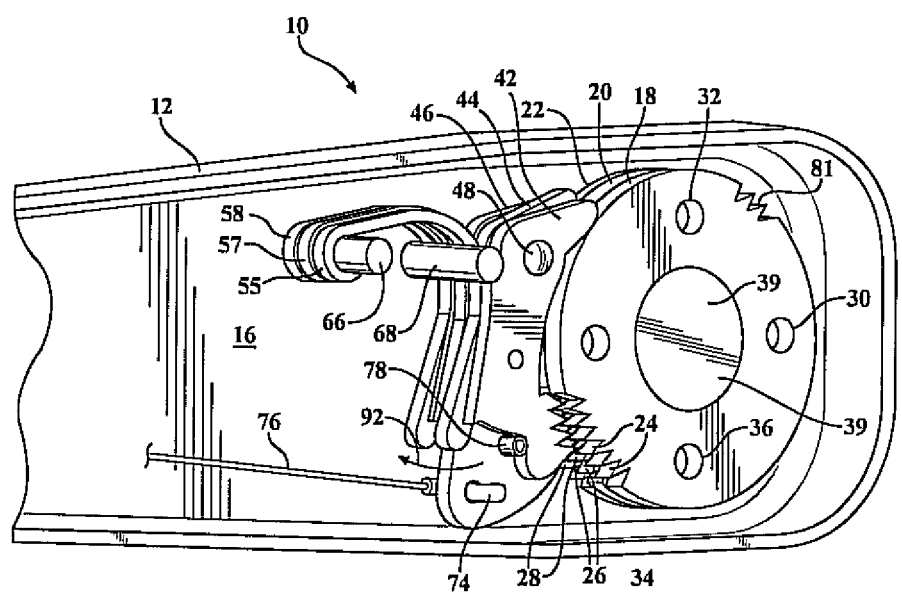
FIG. 2 is a succeeding and enlarged view and better depicting the stacked arrangement of sectors and pawls for enabling successive 2° offset engagement of a selected pawl within a mating teethed location of an aligning sector, such as capable of supporting significant downward forces.

Referring now to FIGS. 1 and 2, a collection of first and second enlarged perspective views are shown of an incrementally adjustable armrest, generally depicted at 10. As will be described in further detail, the armrest 10 can, in one non-limiting application, be employed in a vehicle seat application in which it is desired to provide the dual features of minor armrest angularly adjustability combined with enhanced load supporting capabilities.

Referring initially to FIG. 1, an armrest support frame 12 is supported in pivotal fashion relative to fixed side frame location, further depicted in partial phantom at 14. The armrest support frame 12 exhibits a generally elongated stamped steel or like material, such as including a central recessed support surface 16 surrounded by a raised, perimeter extending and depth defining ledge (see again reference 12 previously provided).

Figure 3:
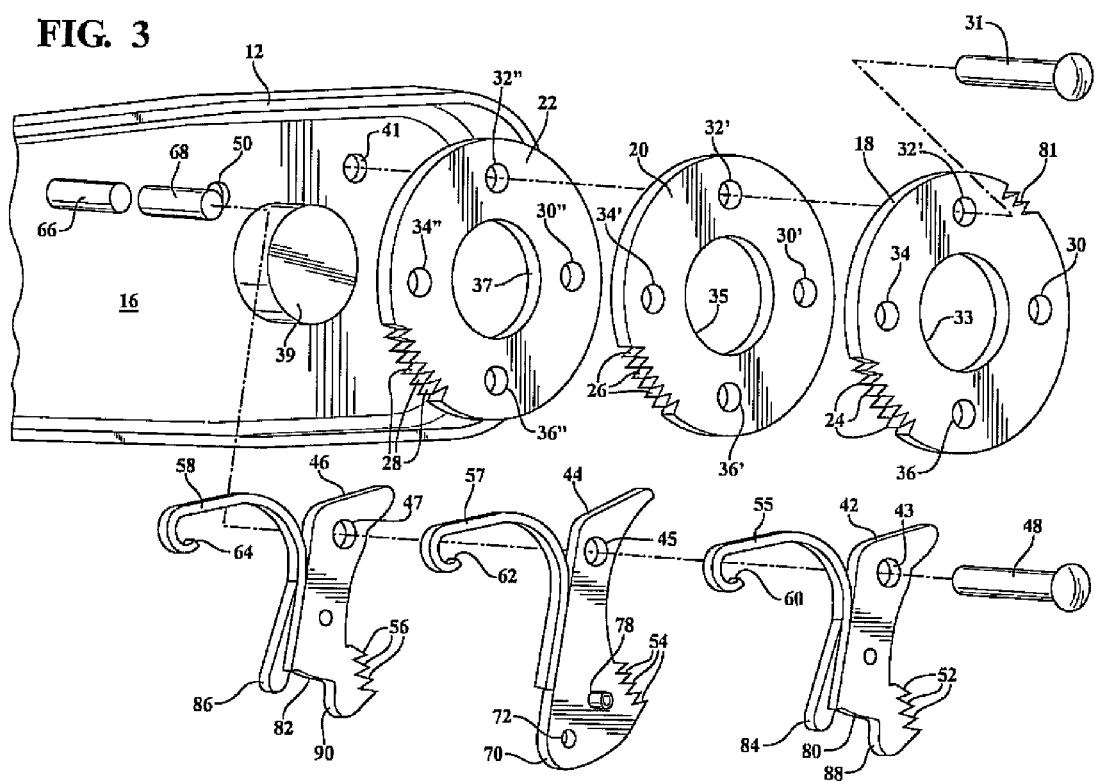
FIG. 3 is an enlarged and exploded view of the armrest assembly.

A plurality (such as including three in one non-limiting application) of stacked and generally circular shaped sectors are depicted at 18, 20 and 22 are shown and as best shown in FIG. 3. Each of the sectors 18, 20 and 22 further include generally aligning (defined as either matched or partially circumferentially offset) pluralities of serrations or teeth (see respectively at 24, 26 and 28 for associated sectors 18, 20 and 22) which extend along a limited exterior facing circumferential range of the overlapping sectors.

The sectors 18, 20 and 22 are anchored together in a fixed manner relative to a range of pivotal motion afforded to the armrest support frame 12, this via a plurality of aligning apertures 30, 32, 34 and 36 positioned at circumferentially offset interior locations and which receive respective fasteners. The exploded view of FIG. 3 depicts the aligning pluralities of apertures 30', 32', 34' and 36' (intermediate stacked sector 20) and 30", 32", 34" and 36" (inner stacked sector 22) and which, in combination with apertures 30, 32, 34 and 36 defined in outermost sector 18, receive such as mounting bolts (see as representatively shown at 31) in FIG. 3).

In this fashion, the stacked array is mounted, via center aligning and likewise inner perimeter defining apertures depicted at 33, 35 and 37 in FIG. 3, in seating fashion over a cylindrical projecting support 39 defined within the interior of the armrest 12. Aside from mechanically fixing the sectors 18, 20, and 22 to the projecting support 39, one or more of the mounting bolts 31 can further seat within a further recess location, e.g. at 41, in order to prevent the sector stack from rotating or misaligning relative to the armrest 12.

Although not shown, any form of inter-rotatable structure can be incorporated between the rotatable seatback frame supported and fixed sector stack 22-26 and the armrest support 12, thereby permitting the support 12 to rotate between the extended position in FIG. 1 and the upward folded non-use position 12'. This can further include the inner cylindrical support 39 (see again as further depicted in FIG. 3) which extends through the aligning central apertures 33, 35 and 37 in the inter-stacked sectors 18, 20 and 22, respectively, while permitting the seatback frame to pivot between the positions 12 and 12' relative to the seatback frame 14. Although not shown, a clock spring or the like can be provided for influencing the armrest support frame 12 in a given rotational direction (see arrow 40) and such as typically in an upward direction relative to the seatback frame 14.

A further like plurality of pawls are depicted at 42, 44 and 46 in pivotally mounted fashion to the seatback sector in proximity to the sectors 18, 20 and 22 and such that the pawl stack rotates along with the seatback arm 12 in proximal fashion to the exterior circumference of the stacked sectors. As best depicted in the exploded view of FIG. 3, the pawls 42, 44 and 46 each depict a generally elongated body with first upper end located and aligning apertures (see collectively at 43, 45 and 47, respectively) which receive a staking rivet 48 which establishes inter-movable properties between the pawls. The rivet 48 can also include an inner stem mounting configuration capable of optionally establishing pivotal support to the armrest 12 inner surface, such as at location 50 shown in FIG. 3.

The pawls 42, 44 and 46 each further exhibit an inwardly facing set of serrations/teeth, of which those associated with the outermost pawl 42 shown at 52 are in alignment with outermost sector 18, with additional and substantially identical and generally aligning and/or partially offset additional pluralities of teeth, at 54 for pawl 44 and further at 56 for pawl 46 being defined upon inwardly facing surfaces thereof and which generally align with the inner stacked sectors 20 and 22. The pawls 42, 44 and 46 are biased in a direction towards the sector stack 18, 20 and 22 via a plurality of arcuate leaf springs 55 (for pawl 42), 57 (for pawl 44) and 58 (for pawl 46), which extend arcuately from rear adjoining surfaces of the stacked pawls 42, 44 and 46.

The leaf springs terminate in outer aligning and curled ends 60, 62 and 64 (FIG. 3) with a first fixed post 66 extending from a recessed surface 16 location of the pivotal armrest support frame. The leaf springs 55, 57 and 58 associated with the pawls 42, 44 and 46 further extend arcuately over a further fixedly projecting stop post 68 (the purpose of which being to control the deflective characteristics of the leaf springs in both concerted and individually displacing fashion as will be subsequently described), with the springs 55, 57 and 58 terminating in integrated fashion with rearward extending locations of the corresponding pawls 42, 44 and 46 and such that the inwardly facing teethed surfaces thereof are normally influenced in a direction towards their aligning and fixed sectors 18, 20 and 22.

The intermediate stacked pawl 44 is configured slightly differently from the innermost 46 and outermost 42 stacked pawls and includes a lowermost projecting and exposed portion 70 which includes a proximately lower end located aperture 72 for receiving a connecting end portion 74 of a retraction cable 76. A pin 78 extends from opposite sides of the intermediate pawl 44 and so that it travels a limited distance along lower surface extending channels defined in the outermost 42 and innermost 46 stacked pawls. An underside depicted channel of limited distance is associated with each of outer 42 and inner 46 pawls shown respectively in FIG. 3 by extending edges 80 and 82, each further defined at opposite ends by first (at 84 and 86) and second (at 88 and 90) end abutments.

The construction of the pawls 42, 44 and 46 are such that, upon retraction of the cable 76 against the spring forces associated with the middle pawl 44 (see arrow 92 in FIG. 2), the center pawl 44 exerts a pulling force on the outer 42 and inner 46 pawls such that all three pivot outwardly in unison, and such that the pin 72 remains in a generally center position of the travel edges (e.g. at 80 and 82) for each of outer 42 and inner 46 stacked pawls. Although not shown, and when the pivotal armrest support is depicted in the upwardly folded seatback position 12' in phantom in FIG. 1, one or more specified set of inwardly facing pawl teeth 52, 54 and 56 are caused to seat within additional recessed and circumferentially offset teeth depicted for example at 81 for outer selected sector 18 at a circumferentially offset location, but which is understood to include additional aligning serrations defined within any one or more of the sectors 18, 20 and 22, these relative to the exposed and incremental position engaging teeth pluralities 24, 26 and 28.

In this fashion, and upon initial retraction of the pawls when in the upright phantom position 12' the armrest 12 may be rotated downwardly until the various pluralities of pawl teeth (again depicted by outermost pawl teeth 52) align with the greater range of teeth 24, 26 and 28 associated with the sector stack 18, 20 and 22. At this point, and according to one non-limiting variant of the present design, the sector teeth each exhibit a first angular offset or increment pattern as compared to that associated with the stacked pawls.

In one example, the three sets of teeth patterns associated with each of the stacked pawls 42, 44 and 46 and their corresponding aligned fixed sectors 18, 20 and 22 are offset, such as by example at 2° relative to one another, this in order to provide 2° incremental adjustability relative to a similar or greater angular offset integrated into the pawls and as a result of a specified offset teeth pattern of a selected pawl seating with an aligning sector location at a given incremental offset. The offset configuration of the matching pawls and sectors is further facilitated by the individual exerting leaf springs 55, 57 and 58 which influence a selected pawl 42, 44 or 46 into engagement with a mating teethed location 24, 26 or 28 of a corresponding selected sector 18, 20 and 22 and upon the armrest 12 achieving a selected and relatively minor incremental angular adjustment (such as again as little at 2° in one non-limiting variant) along the circumferential range of engagement defined by the teeth 24, 26 and 28.

The provision of the opposite projecting pin 78 associated with the central pawl 44, combined with the range of inter-displacement afforded to the outer 42 and inner 46 pawls, further enables selected outer 42 or inner 46 pawl to alternate along with the central pawl 44 in seating within circumferentially incrementing teethed location established along the overlapping ranges of sector teeth 18, 20 and 22. The construction of the pawls and sectors are such that a minimum amount of downward load support (such as a holding force of 220 lbs in one non-limiting variant) is maintained at all adjustment locations.

In additional embodiments, the stacked sectors can (without limitation) exhibit either a consistent incremental teethed pattern across is collective width or, alternatively, can incorporate a similar offset as compared to the retractable pawls, this in order to provide a structurally reinforced assembly. It is further envisioned that the plural stacked sectors can be substituted in favor of a single widened sector exhibiting a standard width extending teethed pattern, the respective overlapping teethed patterns of the corresponding pawl stack each exhibiting the necessary offset configuration for selectively seating with the sector teeth at given angular position.

It is also envisioned that varying pluralities of mating sectors and pawls can be employed in further variations in order to vary either or both the degree of incremental adjustment as well as the range of adjustment. This can also include a single reconfigured/widened pawl operating with a given sector stack.

Having described my invention, other and additional preferred embodiments will become apparent to those skilled in the art to which it pertains, and without deviating from the scope of the appended claims.

I claim:

1. An incrementally adjustable armrest for use with a seatback, said armrest comprising:
    an armrest support frame adapted to being secured in pivotal fashion to a frame location of the seatback;
    at least one sector adapted to being fixed to the seatback frame and supporting a pivotal location associated with said armrest support frame, a plurality of teeth located along a circumferential edge extending location of said sector corresponding to a range of adjustment associated with said armrest support frame; and
    a plurality of pawls arranged in a stacked relationship and pivotally secured to said armrest support frame at a location such that additional teeth associated with said pawls are biased in an engaging direction against said sector;
    a teethed pattern associated with a selected pawl individually seating within a circumferential location associated with said sector teeth.

2. The adjustable armrest as described in claim 1, said at least one sector further comprising a plurality of three stacked sectors and said plurality of pawls including three stacked pawls aligning with said three stacked sectors.

3. The adjustable armrest as described in claim 2, further comprising each of said sectors including generally aligning and individual pluralities of teeth extending along a limited exterior facing circumferential range of adjustment.

4. The adjustable armrest as described in claim 2, said pawls each further comprising a generally elongated body having a first upper end located and aligning aperture receiving a staking rivet extending from said armrest support frame.

5. The adjustable armrest as described in claim 2, further comprising a plurality of arcuate shaped leaf springs secured to said armrest support frame and biasing said pawls towards said sector stack.

6. The adjustable armrest as described in claim 5, further comprising said leaf springs mounted at outer aligning and curled ends with a first fixed post extending from a recessed surface location of said armrest support frame, said leaf springs extending around and over a further fixedly projecting stop post to control deflective characteristics of said leaf springs in both concerted and individually displacing fashion, said leaf springs terminating in integrated fashion with rearward extending locations of corresponding pawls for influencing inwardly facing teethed surfaces thereof in a direction towards said aligning and fixed sectors.

7. The adjustable armrest as described in claim 6, said three stacked pawls further comprising an intermediate stacked pawl being configured slightly differently from innermost and outermost stacked pawls and including a lowermost projecting and exposed portion which includes a proximately lower end located aperture for receiving a connecting end portion of a retraction cable, a pin extending from opposite sides of said intermediate pawl which travels a limited distance along lower surface extending channels defined in said outermost and innermost stacked pawls, upon retraction of said cable against said leaf spring forces associated with said middle pawl, a pulling force being exerted against said outer and inner pawls such that said pawls all pivot outwardly in unison.

8. An incrementally adjustable armrest for use with a seatback, said armrest comprising:
    an armrest support frame adapted to being secured in pivotal fashion to a frame location of the seatback;
    a plurality of first, second and third sectors adapted to being fixed to the seatback frame and supporting a pivotal location associated with said armrest support frame, a plurality of teeth located along a circumferential edge extending location of each of said sectors corresponding to a range of adjustment associated with said armrest support frame; and
    a plurality of first, second and third pawls arranged in a stacked relationship and pivotally secured to said armrest support frame at a location such that additional teeth associated with said pawls are biased in an engaging direction against said sectors;
    a teethed pattern associated with a selected pawl individually seating within a circumferential location associated with said sector teeth.

9. The adjustable armrest as described in claim 8, further comprising each of said sectors including generally aligning and individual pluralities of teeth extending along a limited exterior facing circumferential range of adjustment.

10. The adjustable armrest as described in claim 8, said pawls each further comprising a generally elongated body having a first upper end located and aligning aperture receiving a staking rivet extending from said armrest support frame.

11. The adjustable armrest as described in claim 8, further comprising a plurality of arcuate shaped leaf springs secured to said armrest support frame and biasing said pawls towards said sector stack.

12. The adjustable armrest as described in claim 11, further comprising said leaf springs mounted at outer aligning and curled ends with a first fixed post extending from a recessed surface location of said armrest support frame, said leaf springs extending around and over a further fixedly projecting stop post to control deflective characteristics of said leaf springs in both concerted and individually displacing fashion, said leaf springs terminating in integrated fashion with rearward extending locations of corresponding pawls for influencing inwardly facing teethed surfaces thereof in a direction towards said aligning and fixed sectors.

13. The adjustable armrest as described in claim 12, said three stacked pawls further comprising an intermediate stacked pawl being configured slightly differently from innermost and outermost stacked pawls and including a lowermost projecting and exposed portion which includes a proximately lower end located aperture for receiving a connecting end portion of a retraction cable, a pin extending from opposite sides of said intermediate pawl which travels a limited distance along lower surface extending channels defined in said outermost and innermost stacked pawls, upon retraction of said cable against said leaf spring forces associated with said middle pawl, a pulling force being exerted against said outer and inner pawls such that said pawls all pivot outwardly in unison.

14. An incrementally adjustable armrest for use with a seatback, said armrest comprising:
   an armrest support frame adapted to being secured in pivotal fashion to a frame location of the seatback;
   a plurality of sectors arranged in overlapping fashion and adapted to being fixed to the seatback frame such that said sectors supporting a pivotal location associated with said armrest support frame, a plurality of teeth located along a circumferential edge extending location of each of said sectors corresponding to a range of adjustment associated with said armrest support frame; and
   at least one pawl pivotally secured to said armrest at a location such that additional teeth associated with said pawl is biased in an engaging direction against said sectors;
   a teethed pattern associated with said pawl individually seating within a circumferential location associated with said sector teeth.

15. The adjustable armrest as described in claim 14, said pluralities of sectors and said at least one pawl each further comprising a plurality of three stacked sectors aligning with three stacked pawls.

16. The adjustable armrest as described in claim 15, further comprising each of said sectors including generally aligning and individual pluralities of teeth extending along a limited exterior facing circumferential range of adjustment.

17. The adjustable armrest as described in claim 15, said pawls each further comprising a generally elongated body having a first upper end located and aligning aperture receiving a staking rivet extending from said armrest support frame.

18. The adjustable armrest as described in claim 15, further comprising a plurality of arcuate shaped leaf springs secured to said armrest support frame and biasing said pawls towards said sector stack.

19. The adjustable armrest as described in claim 18, further comprising said leaf springs mounted at outer aligning and curled ends with a first fixed post extending from a recessed surface location of said armrest support frame, said leaf springs extending around and over a further fixedly projecting stop post to control deflective characteristics of said leaf springs in both concerted and individually displacing fashion, said leaf springs terminating in integrated fashion with rearward extending locations of corresponding pawls for influencing inwardly facing teethed surfaces thereof in a direction towards said aligning and fixed sectors.

20. The adjustable armrest as described in claim 19, said three stacked pawls further comprising an intermediate stacked pawl being configured slightly differently from innermost and outermost stacked pawls and including a lowermost projecting and exposed portion which includes a proximately lower end located aperture for receiving a connecting end portion of a retraction cable, a pin extending from opposite sides of said intermediate pawl which travels a limited distance along lower surface extending channels defined in said outermost and innermost stacked pawls, upon retraction of said cable against said leaf spring forces associated with said middle pawl, a pulling force being exerted against said outer and inner pawls such that said pawls all pivot outwardly in unison.

\* \* \* \* \*

UNITED STATES PATENT AND TRADEMARK OFFICE
CERTIFICATE OF CORRECTION

| | |
|---|---|
| PATENT NO. | : 8,702,174 B2 |
| APPLICATION NO. | : 13/617152 |
| DATED | : April 22, 2014 |
| INVENTOR(S) | : Pacolt |

Page 1 of 1

It is certified that error appears in the above-identified patent and that said Letters Patent is hereby corrected as shown below:

In the Title Page:

Item [56]

Delete "4,521,564    6/1985    Solomon et al"

Insert --4,621,864    1986-11-11    Hill--.

Signed and Sealed this
Fourteenth Day of October, 2014

Michelle K. Lee
*Deputy Director of the United States Patent and Trademark Office*